(12) United States Patent
Ohsawa et al.

(10) Patent No.: US 6,967,288 B2
(45) Date of Patent: Nov. 22, 2005

(54) SHIELD CABLE METHOD OF MANUFACTURING SHIELD CABLE, AND DISCHARGE LAMP LIGHTING DEVICE USING SHIELD CABLE

(75) Inventors: Takashi Ohsawa, Tokyo (JP); Fumihiro Minami, Tokyo (JP); Mutsuo Sekiya, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/110,677

(22) PCT Filed: Aug. 17, 2001

(86) PCT No.: PCT/JP01/07097

§ 371 (c)(1),
(2), (4) Date: Apr. 16, 2002

(87) PCT Pub. No.: WO02/17333

PCT Pub. Date: Feb. 28, 2002

(65) Prior Publication Data

US 2002/0155738 A1   Oct. 24, 2002

(30) Foreign Application Priority Data

Aug. 18, 2000 (JP) ............................... 2000-248160

(51) Int. Cl.[7] .......................... H02G 3/00; H01B 17/22
(52) U.S. Cl. .................................. 174/104; 174/102 R
(58) Field of Search ............................. 315/77–78, 80, 315/82; 313/242, 239, 348, 350; 362/551, 362/554, 552; 174/102 R, 103–104, 5 SG, 174/35 R–36, 90, 99 R

(56) References Cited

U.S. PATENT DOCUMENTS

| 5,349,133 | A | * | 9/1994 | Rogers ........................ 174/36 |
| 5,374,778 | A | * | 12/1994 | Hashimoto et al. ........... 174/36 |
| 5,879,073 | A | * | 3/1999 | Hori et al. ................... 362/344 |
| 6,072,277 | A | * | 6/2000 | Yamamoto et al. ........... 315/82 |
| 6,161,951 | A | * | 12/2000 | Yoneyama et al. .......... 362/516 |
| 6,243,018 | B1 | * | 6/2001 | Saito et al. .................. 340/650 |
| 6,309,089 | B1 | * | 10/2001 | Yoneyama et al. .......... 362/263 |
| 6,325,529 | B1 | * | 12/2001 | Ito .............................. 362/539 |
| 6,540,385 | B2 | * | 4/2003 | Ikeda et al. .................. 362/512 |

FOREIGN PATENT DOCUMENTS

| JP | 3-136938 | 6/1991 |
| JP | 10-289764 | 10/1998 |

* cited by examiner

Primary Examiner—Wilson Lee
Assistant Examiner—Minh Dieu A
(74) Attorney, Agent, or Firm—Sughrue Mion, PLLC

(57) ABSTRACT

A shielding wire is provided with a first conductor, a shield for sheathing the first conductor through an insulating member, and a second conductor which is in contact with the shield. Therefore, a troublesome step of unknitting the braid of the shield is eliminated, and the work is done at a higher efficiency and the manufacturing cost is reduced.

10 Claims, 20 Drawing Sheets

SHIELD CABLE METHOD OF MANUFACTURING SHIELD CABLE, AND DISCHARGE LAMP LIGHTING DEVICE USING SHIELD CABLE

This application is a 371 of PCT/JP01/07097 Aug. 17, 2001.

1. Technical Field

This invention relates to a shielding wire which is used, e.g., for a headlight of a motor vehicle and for a discharge lamp used in an illumination lamp or a street light in an outdoor facility, a warehouse, a factory, or the like, and to a method of manufacturing the shielding wire, as well as to a lighting device for a discharge lamp using a shielding wire.

2. Background Art

Conventionally, a shielding wire having wound a copper foil or a copper wire around a wire has been used in a high-voltage harness, or the like, so as to shield electromagnetic noises produced from the harness.

For example, as described in JP 289764/1998 A, as a method of connecting a shield layer of the shielding wire to a connector, it makes a custom of peeling off a terminal end of the shielding wire such that a conductor and a shield layer thereof are exposed, and of connecting respectively the conductor and the shielding layer of the shielding wire to the terminal on the connector side.

In this kind of prior art, the so-called peeling off was required. In addition, the shield layer and the connector are connected by contact or soldering. Thus, secure fixing of the connector is necessitated to make sure the connection.

Further, in a discharge lamp used as a headlight for a motor vehicle, a shielding wire is used to avoid the effect of the electromagnetic wave noises on other onboard devices.

FIG. 1 is a longitudinal sectional view of a conventional high-intensity discharge (HID) headlamp as disclosed, e.g., in JP 136938/1991 A, or the like.

Referring to FIG. 1, a reflector 2 is mounted inside a housing 1, which acts as a reflecting mirror for controlling convergent of the optical axis, and on inner surface of which a reflecting surface is coated. An HID bulb 4 held by a bulb socket 3 is mounted substantially in the central portion of the reflector 2. An ignitor 5 for generating a high voltage of, e.g., 30 KV to ignite the HID bulb 4 is housed in an HID lighting device.

The lighting of the HID lighting device is controlled by a power control circuit (ballast) 7. The HID lighting device thus configured instantaneously applies a high voltage to the HID bulb 4 and induces a high-voltage discharge of the HID bulb 4, giving rise to a discharge of a gas filled within the bulb and lights it up. Reference numeral 8 denotes a lens, and a luminous flux of the HID bulb is diffused to a predetermined range through this lens 8 to illuminate the ahead of a motor vehicle. This secures safety of the vehicle while running in the dark. In addition, this kind of HID lamp is mounted in a space between a bumper 9 and an engine hood 10.

Reference numeral 11 denotes a board which is attached to the reflector 2 and on which the HID bulb 4 is assembled, reference numeral 12 a transformer having wound therearound a primary coil and a secondary coil for generating a starting voltage of the HID bulb, reference numeral 13 a capacitor for charging the starting energy, and reference numeral 14 a discharge gap element. As a result of occurrence of a potential difference charged in the capacitor 13 across both ends of the discharge gap element 14, the gas sealed in the element instantaneously starts to discharge from a dielectric breakdown, whereby the primary coil of the transformer 12 is charged with electricity. Consequently, a high-voltage pulse of 20 KV through 30 KV is generated in the secondary coil of the transformer 12 to illuminate the HID bulb 4 by electric discharging.

In addition, the power control circuit (ballast) 7 for controlling the power supply to the HID lighting device and the lighting fixture are connected by a harness (shielding wire) 16. Further, in order to shield the electromagnetic waves which leak out through the harness 16, the outside of the harness 16 is covered with an electromagnetic wave shield sleeve 17. As an ordinary electromagnetic wave shield sleeve 17, a sleeve type braided with very fine copper wires is often used.

FIG. 2 is a perspective view explaining the method of connecting the terminal of the shield sleeve 17 to the connector. FIGS. 2A and 2B are intended for describing different terminal making methods.

In FIGS. 2A, 2B, both ends of the shield sleeve 17 are made apart from the harness 16 and are provided with a shield terminal 18 for the lighting fixture and a shield terminal 19 for the ballast to enable them to be electrically connected to the lighting fixture and to the ballast, respectively. Similarly, the harness 16 is provided on both ends thereof with a harness terminal 16a, respectively.

FIG. 2A shows a situation in which, after unknitting the braid at the terminal end of the shield sleeve 17, the very fine copper wires are bundled to connect them to the shield terminal 18. FIG. 2B shows a situation in which, after connecting another conductor 17a to a terminal of the shield sleeve 17, e.g., by soldering, or the like, the shield terminal 18 is connected to the conductor 17a.

The method shown in FIG. 2B, unlike that described in JP 289764/1998 A in which the terminal end of the shielding wire is peeled off and then the shield layer is connected to the terminal on the connector side, the shield sleeve 17 forms the outermost layer of the shielding wire, so that there is no need of peeling off.

In the above conventional examples, in the case, e.g., of FIG. 2A, unknitting of the braid of the terminal end is indispensable. This work is, however, very troublesome no matter whether it is done manually or automatically, thus decreasing the work efficiency and increasing the cost.

In the case of FIG. 2B, while it obviates the need of unknitting the braid at the terminal end of the shield sleeve 17, the connection to the braid must be resorted to soldering or the like. It follows that the connected portion experiences lowering in mechanical strength and increases the electrical connection resistance.

This invention has been made to solve the above problems and an object thereof is to provide a shielding wire which has a high mechanical and electrical reliability without calling for the troublesome work of braiding at the shield sleeve terminal, or the like.

DISCLOSURE OF INVENTION

A shielding wire of the invention includes a first conductor; a shield for sheathing the first conductor through an insulating member; and a second conductor which is passing through inside the shield and is in contact with the shield. Therefore, this provides connection between the shield and the outside through the second conductor, facilitating the connection between the shield and the outside.

Further, the shielding wire includes a first conductor; a shield for sheathing the first conductor through an insulating member; a bundled portion for bundling the shield and the first conductor from outside thereof; and a second conductor which is in contact with the shield, one end of the second conductor being led from one end of the shield and the other end of the second conductor is laid to a central portion of the shield relative to the bundled portion. Therefore, this provides connection between the shield and the outside through the second conductor, facilitating the connection between the shield and the outside. Further, this easily fixes the second conductor to the shield by the bundled portion.

Further, the shielding wire includes a first conductor; a shield for sheathing the first conductor through an insulating member; a second conductor which is laid along the outside of the shield and is in contact therewith; and a bundled portion for bundling the shield, the first conductor and the second conductor from outside thereof. Therefore, this provides connection between the shield and the outside through the second conductor, facilitating the connection between the shield and the outside. Further, this obviates a step of inserting the second conductor into the shield and easily fixes the second conductor to the shield.

The second conductor is preferably used for grounding, thus easily grounding the shield to the outside.

Further, the second conductor is preferably spirally wound inside the shield, thus making larger the contact area between the second conductor and the shield.

Still further, the second conductor is preferably able to take out from the shield, thus enabling adjustment of the length of the second conductor at need, and making the second conductor attachable to various devices.

A lighting device for a discharge lamp of the invention is used for a headlamp of a vehicle and employs a shielding wire. The device includes a bulb socket for the headlamp; a driving power circuit for the headlamp; and a shielding wire for connecting the bulb socket and the driving power circuit. The shielding wire has a first conductor for supplying alternating current from the driving power circuit to the bulb socket and a shield for sheathing the first conductor. The shielding wire has a second conductor laid along the shield so as to be in contact with the shield. Therefore, this shields the electromagnetic waves to be generated by the alternating current supplied from the driving power circuit by a simple structure.

Further, since the second conductor is preferably grounded to a vehicle body, thus easily grounding the shield to the vehicle body and further ensuring shielding of the first conductor by the shield.

A method of the invention is intended for manufacturing of a shielding wire including a first conductor; a shield for sheathing the first conductor through an insulating member; a second conductor laid along the inside of the shield so as to be in contact with the shield; and a bundled portion for bundling the shield, the first conductor and the second conductor from outside thereof. The method involves the steps of inserting the first conductor sheathed with the insulating member and the second conductor into the shield; and bundling the shield, the first conductor and the second conductor by the bundled portion in a state in which the first conductor and the second conductor are inserted into the shield. Therefore, this allows manufacturing of a lead wire required for connecting the shield to the outside in a simple step of bundling the second conductor.

A lighting device for a discharge lamp of the invention is used for a headlamp of a vehicle and employs a shielding wire and a connector for connecting the shielding wire. The device includes a bulb socket disposed inside a lighting fixture of the headlamp; a driving power circuit mounted outside of the lighting fixture of the headlamp; a casing for housing therein the driving power circuit; a shielding wire for connecting the bulb socket and the driving power circuit, the shielding wire having a first conductor for supplying alternating current from the driving power circuit to the bulb socket and a shield for sheathing the first conductor; a ground wire laid along the shielding wire; and a ground wire coupling-connector to which the ground wire is connected, inserting direction of the ground wire connecting connector being parallel with the upper surface of the casing of the driving power circuit. Therefore, this endures deformation of the terminal of the ground wire coupling-connector, and permits vertical formation of a projection on the upper surface of the casing to prevent the deformation in the inserting direction, thus simplifying the die for the casing.

BEST MODE FOR CARRYING OUT THE INVENTION

In order to describe this invention in more detail, the best mode for carrying out the invention will be described with reference to the accompanied drawings.

First Embodiment

FIGS. 3 through 6 are intended for explaining the shielding wire of the first embodiment of the invention.

Figure 1:
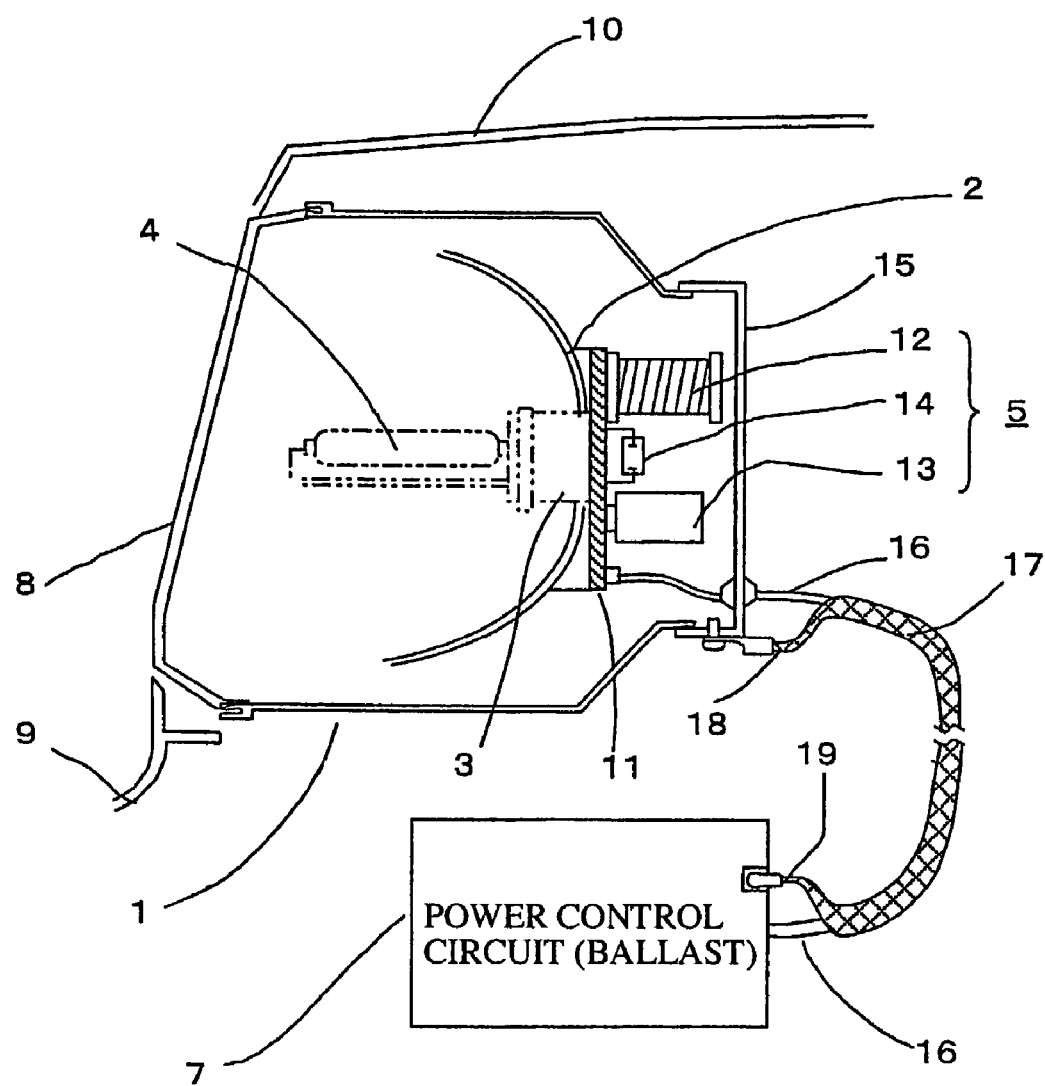
FIG. 1 is a sectional view describing a state in which a conventional HID lighting device is mounted on a vehicle.
Figure 2:
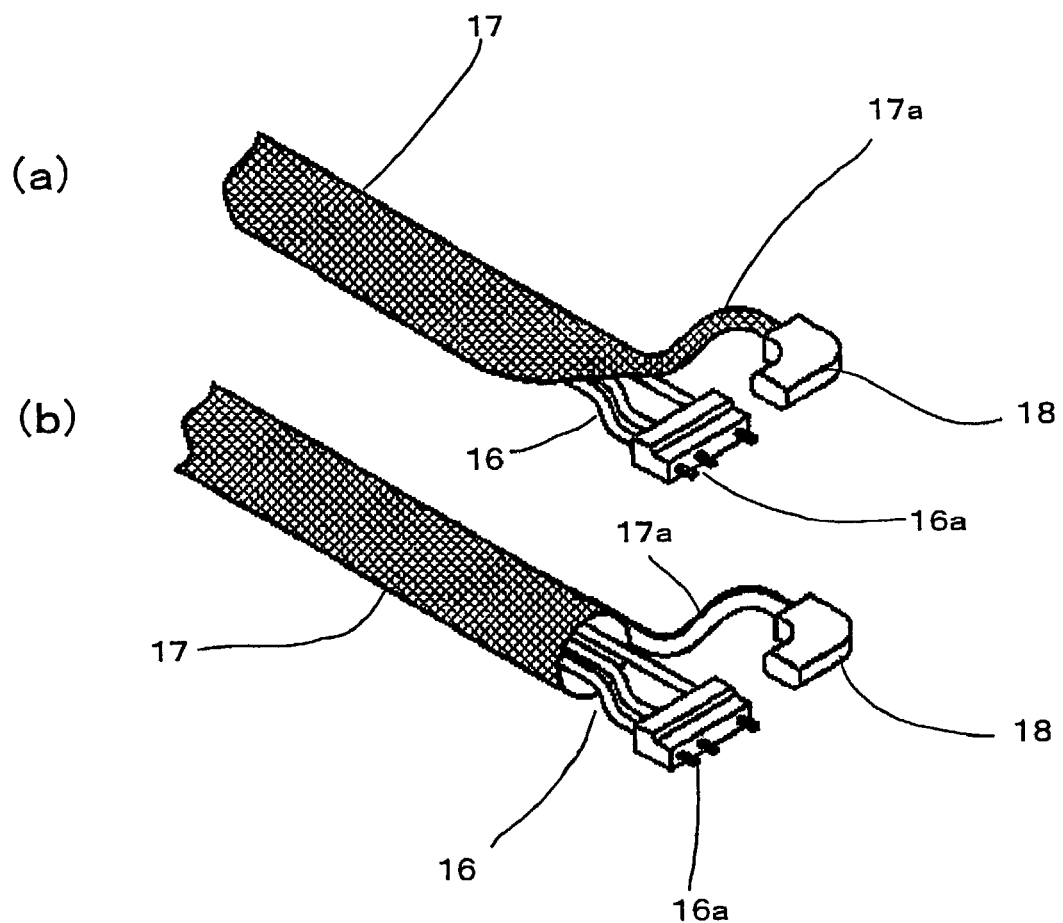
FIGS. 2A and 2B are perspective views explaining a lead wire for connector connection of an electromagnetic wave shielding wire in the conventional HID lighting device.
Figure 3:
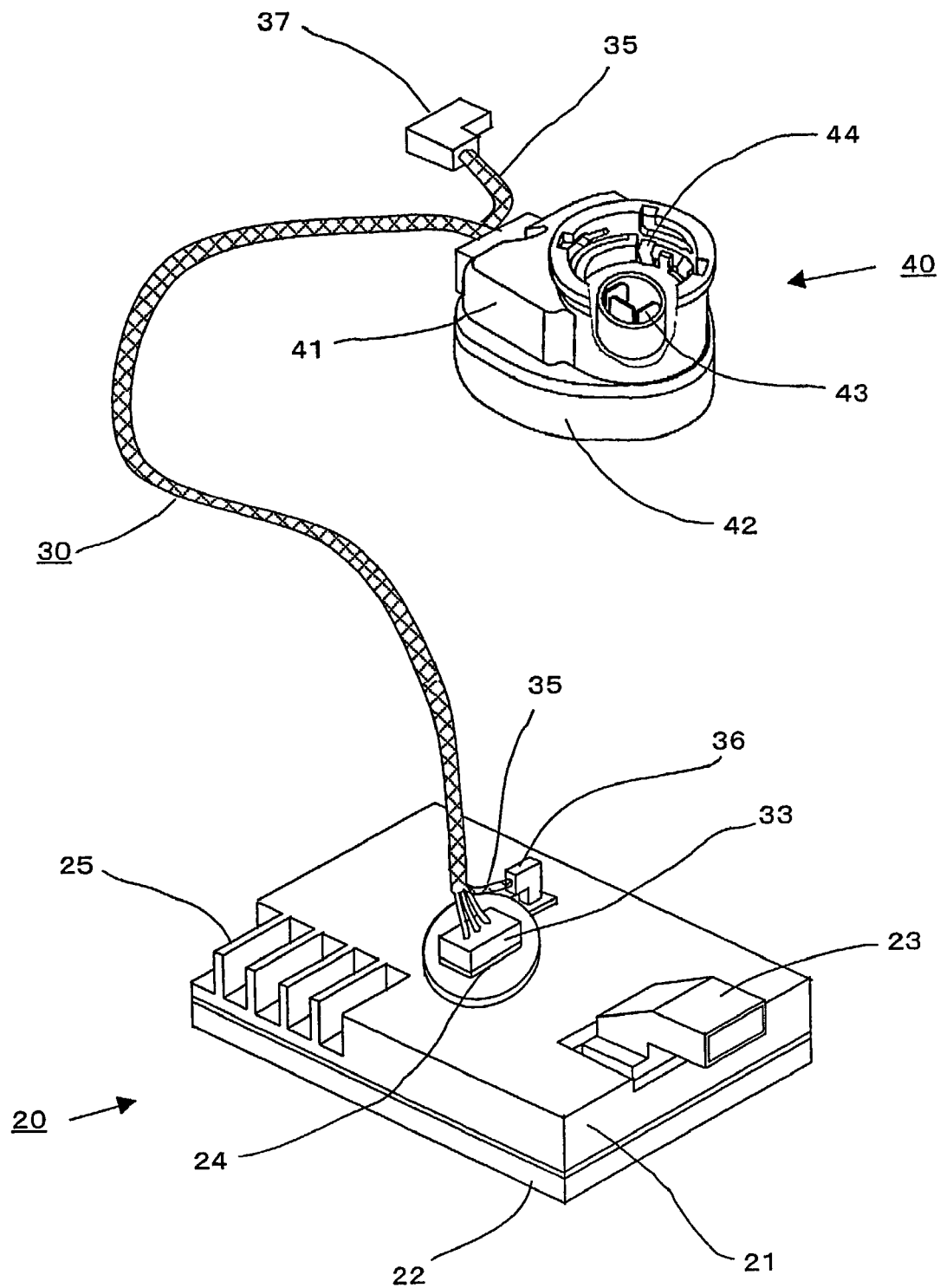
FIG. 3 is a perspective view showing an external view of a ballast and a bulb socket in a first embodiment of the invention.
Figure 4:
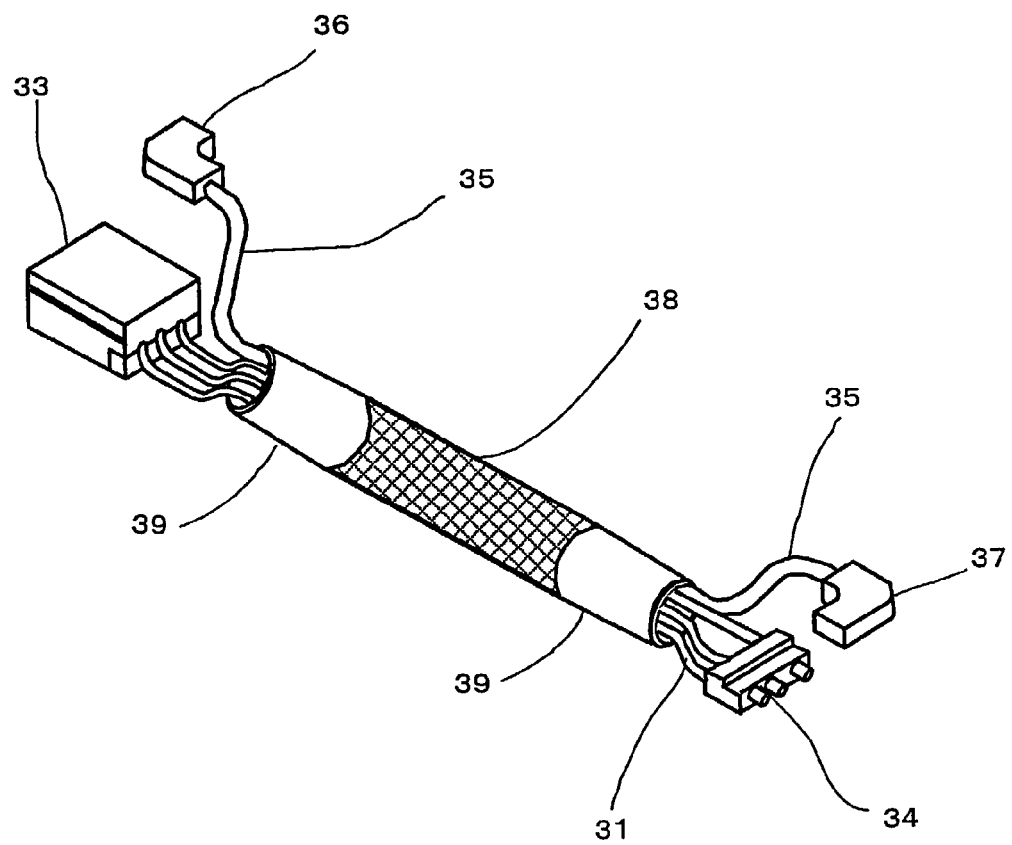
FIG. 4 is a perspective view showing an external view of an electromagnetic wave shielding wire in a first embodiment.

FIG. 3 is a perspective view showing an external view of a ballast and an ignitor-integrated type bulb socket in an HID lighting device for a motor vehicle, and FIG. 4 is a perspective view showing the harness thereof.

Figure 5:
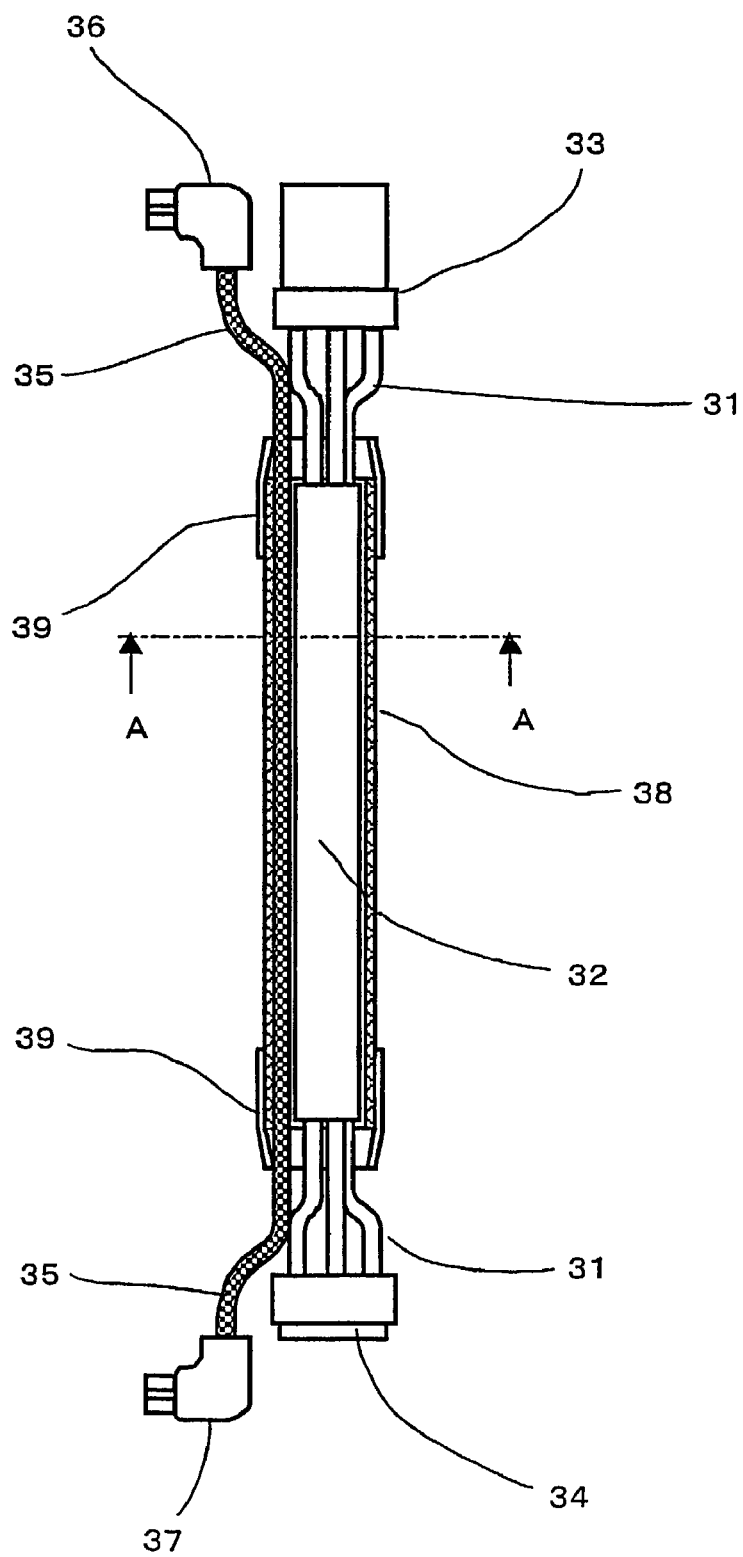
FIG. 5 is an axial sectional view of the electromagnetic wave shielding wire in a first embodiment.
Figure 6:
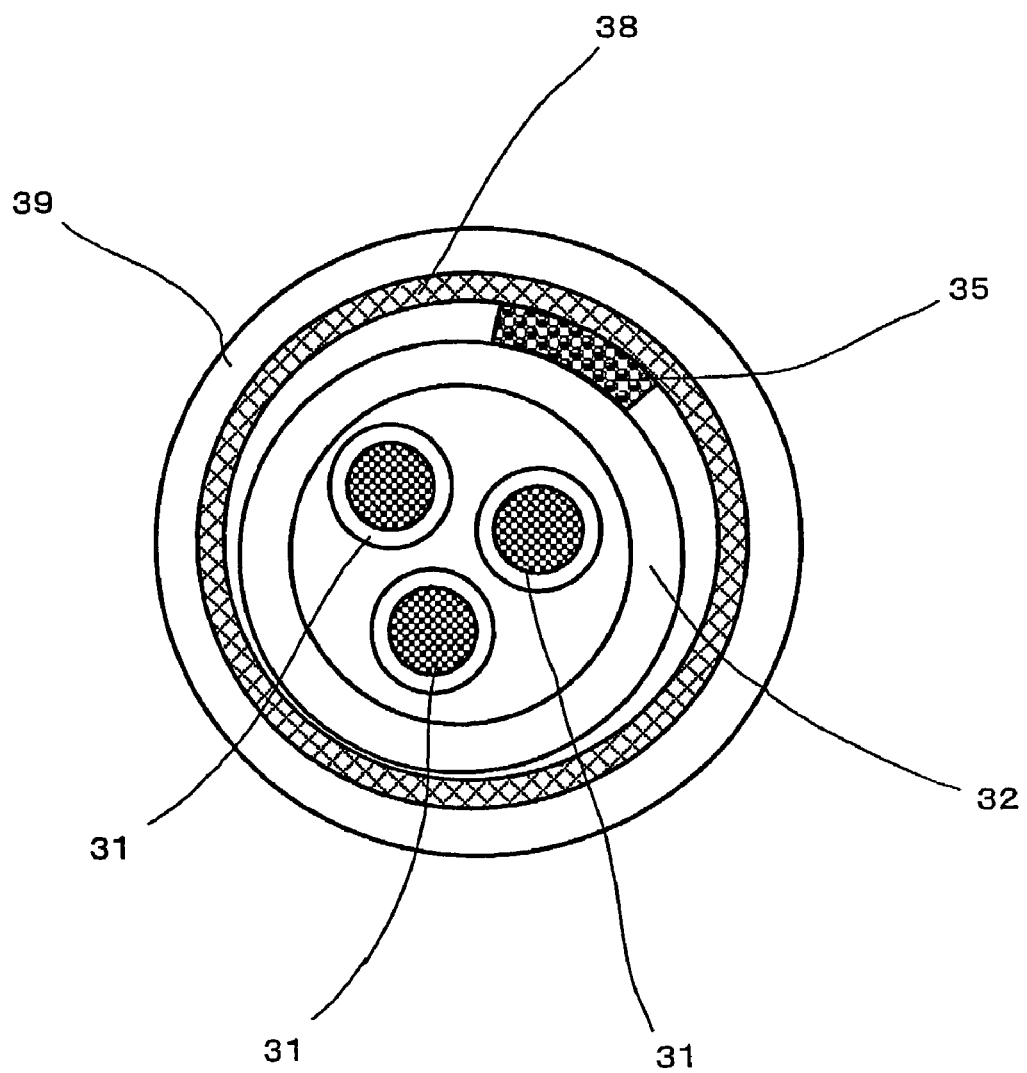
FIG. 6 is a sectional view taken along the line A—A in FIG. 5 showing a cross section of the electromagnetic wave shielding wire in a first embodiment.

FIG. 5 shows an axial sectional view of the harness, and FIG. 6 is a sectional view taken along the line A—A in FIG. 5.

Referring to FIGS. 3, reference numeral 20 denotes a ballast containing therein a power source and a control circuit, reference numeral 21 an upper case of the ballast, reference numeral 22 a lower case of the ballast, reference numeral 23 a connector on the power source side for supplying a DC power source from an onboard battery (not shown) into the ballast 20, and reference numeral 24 a connector on the output side for supplying power to the lighting fixture. Reference numeral 25 denotes heat-radiating fins for falling down the heat inside the ballast. Reference numeral 30 denotes a harness (shielding wire) and a detailed description of which will be made later. Although the ballast 20 is disposed outside the lighting fixture, it may also be disposed inside the lighting fixture.

Reference numeral 40 denotes a bulb socket integrally contained therein a starting circuit which, upon receipt of driving electric power transmitted from the ballast 20 through the harness 30, controls lighting of the HID bulb 4. Reference numeral 41 denotes an upper case of the bulb socket 40, reference numeral 42 a lower case thereof, reference numeral 43 a high-voltage side terminal which comes into contact with a high-voltage side plug of the HID bulb 4, and reference numeral 44 a low-voltage side terminal which comes into contact with a low-voltage side plug of the HID bulb 4.

The construction of the harness 30 will be described with reference to FIGS. 4, 5.

Referring to FIGS. 4, 5, reference numeral 31 denotes signal lines through which drive control signals are transmitted, reference numeral 32 a cross-linking polymer tube which integrally bundles the plural signal lines 31, reference numeral 33 a first socket which is joined with a terminal of the ballast 20 of the signal lines 31 and is connected by insertion into the connector 24 of the ballast 30, reference numeral 34 a second socket which is joined with a terminal of the bulb socket 40 of the signal lines 31 and is connected by insertion into the bulb socket 40, reference numeral 35 a continuous lead wire for connector connection, reference numeral 36 a lead connector on the ballast side and reference numeral 37 a lead connector on the ignitor side. Reference numeral 38 denotes a cover shielding wire (cable sheath) which is covered or sheathed on the outside of both the signal lines 31 bundled by the cross-linking polymer tube 32 and the lead wire 35 for connector connection. Reference numeral 39 denotes a heat-contraction resin tube fitted onto the outside of each end of the cover shielding wire 38 contracts upon heating. With these resin tubes 39, the signal lines 31 bundled by the cross-linking polymer tube 32, the lead wire 35 for connector connection and the cover shielding wire 38 are integrally fixed together.

FIG. 6 is a sectional view showing a cross section taken along the line A—A in FIG. 5, which explains the cross section of the harness 30.

In the central portion in FIG. 6, three signal lines 31 are provided for transmitting electric power and electrical signals from the ballast 20, and the outside of which is covered by the cross-linking polymer tube 32. The lead wire 35 for connector connection is sandwiched between the cross-linking polymer tube 32 and the cover shielding wire 38 which lies on the outside thereof. The outside of the lead wire 35 is covered with the cover shielding wire 38. Reference numeral 39 denotes a heat-contraction resin tube which fixes the terminal end on the ballast side of the cover shielding wire 38.

Here, the lead wire 35 for connector connection and the cover shielding wire 38 are both braided shielding wires which are formed by braiding wires made up chiefly of copper fine wires and flexible resin fine wires. The copper base fine wires of the cables 35, 38 are subjected to a surface treatment by soldering with gold, silver, tin, nickel or zinc.

The structural features of the first embodiment thus constructed above are summarized as follows.

As a first feature, the lead wire 35 for connector connection is provided separate from the cover shielding wire 38. Such an arrangement obviates the troublesome preparatory work such as unknitting of the braided wires at the ends of the cover shielding wire 38, which has been conventionally practiced to form a lead wire for connector connection. In other words, it is possible to directly join the connectors 36 and 37, without preparatory works, to both ends of that lead wire 35 for connector connection, which is provided separate from the cover shielding wire 38. Therefore, the productivity is largely improved, enabling mass production.

As a second feature, since the lead wire 35 for connector connection is provided inside the cover shielding wire 38, they contact with each other over the larger area as a necessary consequence. Therefore, there is no possibility of impairing the characteristics as a shielding wire for shielding the electromagnetic waves (an electromagnetic wave shielding wire).

As a third feature, since the lead wire 35 for connector connection is taken as a braided conductor in the same manner as the cover shielding wire 38, compared with an ordinary single wire or stranded wire, it electrically contact with the cover shielding wire 38 over the larger area. The performance as the electromagnetic wave shielding wire is further improved. Further, since both are braided conductors, they are susceptible to bending and deformation in shape and are easy in laying out in an arrow portion in a motor vehicle, or the like. Still further, since the cable has a high resistivity to the bending deformation, it is devoid of disadvantages such as damages due to vehicle vibrations, or the like.

As a fourth feature, since the surfaces of the copper base fine wires in the lead wire 35 for connector connection and the cover shielding wire 38 are plated with the nickel or tin brazing, electric contact resistance is small and, even if they are exposed for a long period of time to the high-temperature atmosphere of 100° C. or more, they will exert scarcely an influence such as change in color, deformation, lowering in electric performances, thermal deterioration, or the like, resulting in a remarkably high reliability.

As a fifth feature, since both ends of the cover shielding wire 38 are covered with the heat-contraction resin, the copper base fine wires are prevented from being loose at the cut surface of the cover shielding wire 38. Further, since the signal lines 31, the lead wire 35 for connector connection, and the cover shielding wire 38 are integrally bundled together, they are prevented from occurrence of dislocation as a result of bending.

Second Embodiment

Figure 7:
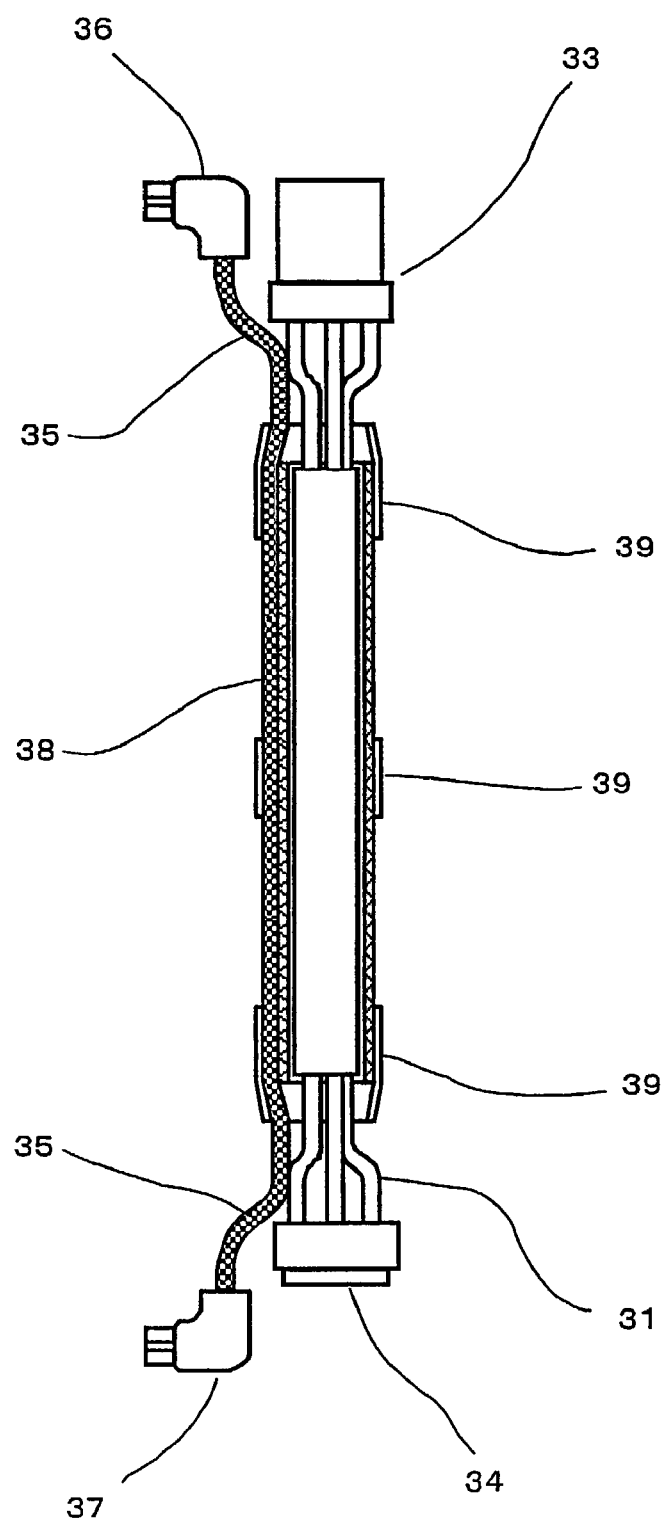
FIG. 7 is an axial sectional view of the electromagnetic wave shielding wire in a second embodiment of the invention.

FIG. 7 is an axial sectional view explaining the electromagnetic wave shielding wire of the second embodiment of the invention. The same reference numerals as those in the above the first embodiment indicate the same components, and therefore descriptions thereof are omitted for brevity s sake.

Here, the difference from the above first embodiment is in that the lead wire 35 for connector connection runs along the outside of the cover shielding wire 38. In this manner, by providing the lead wire 35 for connector connection outside the cover shielding wire 38, the lead wire 35 for connector connection is attached in the last manufacturing step. In other words, the plurality of signal wires 31 bundled together by the cross-linking polymer tube 32 are laid along the inside of the cover shielding wire 38 and thereafter the lead wire 35 for connector connection is laid therealong and both ends thereof are fixed by heat-contraction tubes 39. Taking this kind of arrangement saves the trouble of inserting the lead wire 35 for connector connection into the inside of the cover shielding wire 38.

Preferably, the heat-contraction tubes 39 may be provided for binding both members together not only on both ends but also in the central portion in more than three portions. This makes it possible to prevent lowering in performance due to decrease in the electrical contact area between the lead wire 35 for connector connection and the cover shielding wire 38 at the time of bending the electromagnetic wave shielding wire.

Third Embodiment

Figure 8:
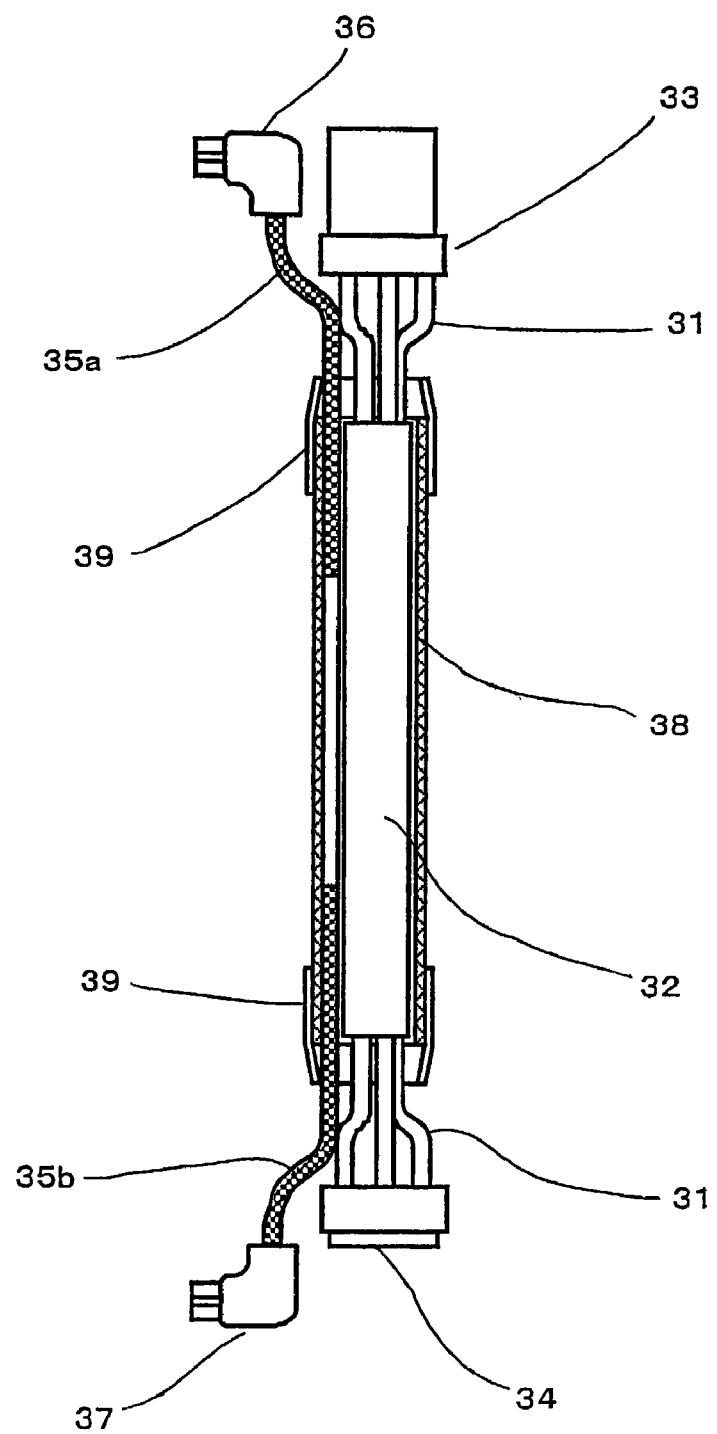
FIG. 8 is an axial sectional view of the electromagnetic wave shielding wire in a third embodiment of the invention.

FIG. 8 is an axial sectional view explaining the electromagnetic wave shielding wire of the third embodiment of the invention. The reference numerals in FIG. 8 are the same as those described in the above the first embodiment, and therefore descriptions thereof are omitted for brevity s sake.

The difference from the above first and second embodiments is in that the lead wire 35 for connector connection is not a continuous wire extending to both ends but is divided on both sides.

Referring to FIG. 8, reference numeral 35a denotes a first lead wire for connector connection which is connected to the ballast 20 side and reference numeral 35b denotes a second lead wire for connector connection which is connected to the bulb socket 40 side. As described above, since lead wires 35a and 35b for connector connection are separately provided and the lengths of the lead wires 35a and 35b for connector connection are made long enough to secure the required area of contact with the cover shielding wire 38. This, for example, even in case the total length of the electromagnetic wave shielding wire becomes long, the length of the lead wires 35a and 35b for connector connection is held down to the minimum one. Therefore, cutting of the unnecessary length reduces the cost in material.

In case the lead wire 35 for connector connection are provided outside the cover shielding wire 38, the cut end surfaces opposite to those to be connected to the first connector 36 and to the second connector 37 will be exposed. Therefore, it is desirable that the lead wire 35 for connector connection should be provided inside the cover shielding wire 38.

In addition, in case the lead wire 35 for connector connection are provided outside the cover shielding wire 38, it may be so arranged that the cut end surfaces opposite to those to be connected to the first connector 36 and to the second connector 37 are respectively provided inside the heat-contraction resin tubes.

Fourth Embodiment

The fourth Embodiment is directed to explain the grounded terminal of the ballast 20.

FIGS. 9 through 13 are explanatory perspective views showing the neighborhood of the connector on the output side of the ballast 20.

Referring to FIGS. 9 through 13, reference numeral 50 denotes a ballast connector which is formed as a part of, or separate from, the ballast 20. Reference numeral 51 denotes a terminal which is connected to the lead connector 36 (ground wire) of the harness 16. On one bent end 51b, a terminal 51a is formed by further bending. The other end 51c which is bent to the opposite direction is fixed, with a fixing screw 52, to a terminal fixing seat 53 of the ballast 20. Reference numeral 54 denotes a hole for connector into which the connector 24 on the output side is inserted for protruding to the outside. The terminal fixing seat 53 is formed by aluminum die casting together with the ballast connector 50.

Figure 9:
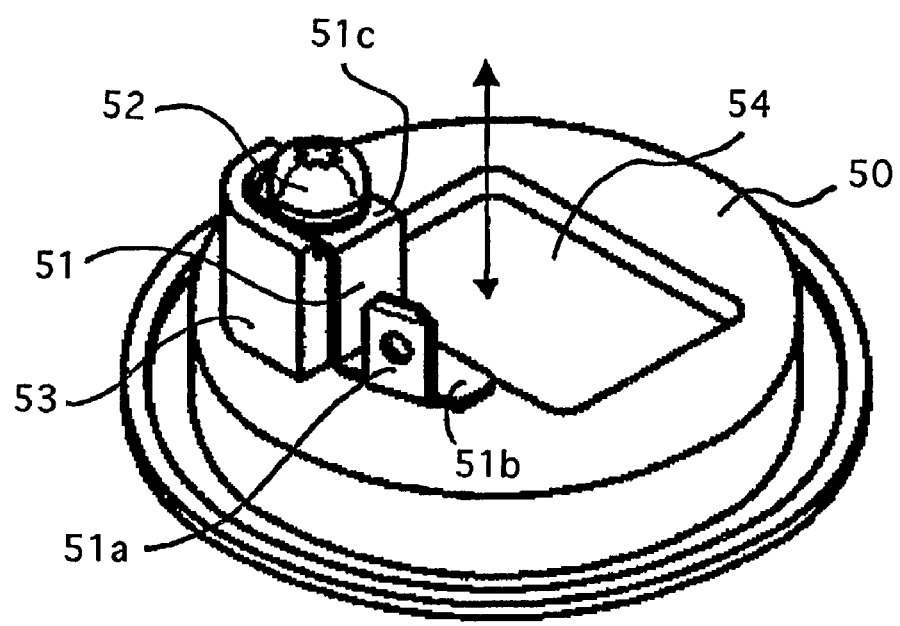
FIG. 9 is a perspective view showing the neighborhood of the connector in the ballast according to a fourth embodiment of the invention.

FIG. 9 shows an arrangement in which the terminal 51a is inserted downward as shown by an arrow in FIG. 9.

In the arrangement shown in FIG. 9, when the connector is inserted into, or pulled out from the terminal 51a, one end 51b of the terminal 51 displaces in the horizontal or vertical direction, giving rise to a deformation. As a result, insertion and pull out from the connector sometimes become difficult.

Figure 10:
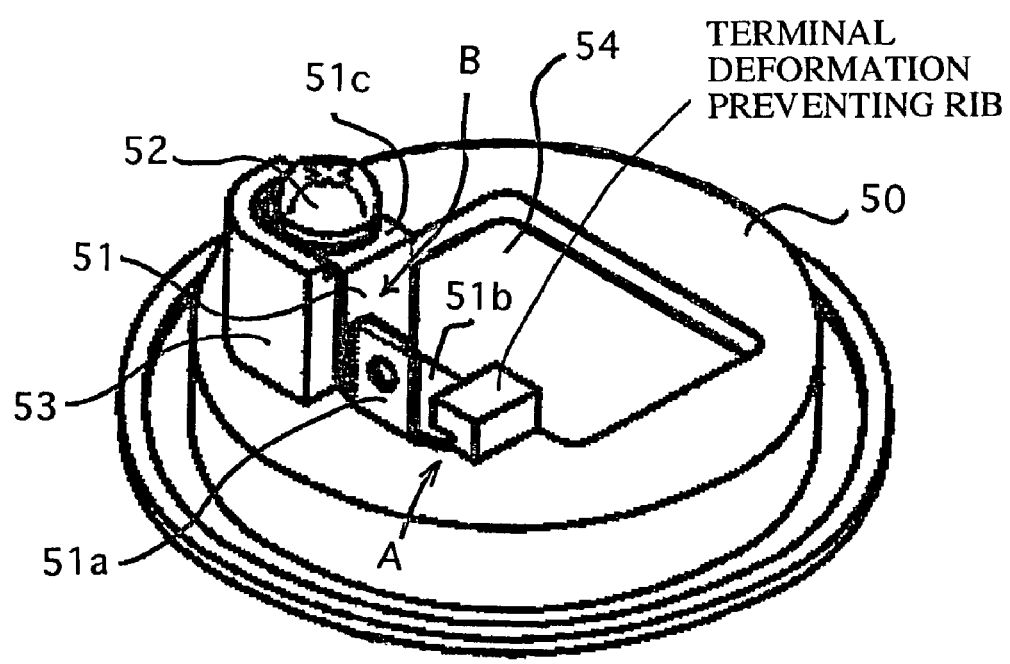
FIG. 10 is a perspective view showing the neighborhood of the connector in the ballast according to a fourth embodiment.

To avoid the above disadvantage, as shown in FIG. 10, one end 51b of the terminal 51 may be fixed by a terminal deformation preventing rib.

However, the arrangement shown in FIG. 10 necessitates the terminal deformation preventing rib and, therefore, it leads to the complicated structure. In particular, in case the terminal deformation preventing rib is formed together with the ballast connector 50 by aluminum die casting, it is necessary to execute a complicated process such as with a sliding die in order to form the rib of interest (the portion designated by "A" in FIG. 10). Further, the intermediate section of the terminal 51 (the portion designated by B in FIG. 10) may give rise to a twisting deformation.

Figure 11:
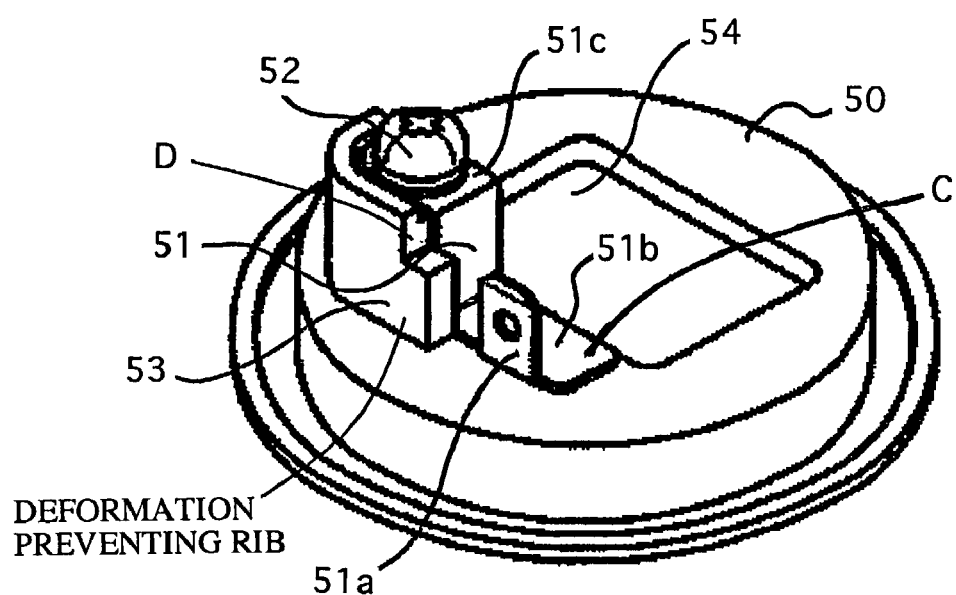
FIG. 11 is a perspective view showing the neighborhood of the connector in the ballast according to a fourth embodiment.

To that end, as shown in FIG. 11, as the terminal deformation preventing rib for pushing the side of one end 51b of the terminal 51, there exists an approach of facilitating the formation of the die. In the arrangement shown in FIG. 11, however, the vertical deformation at one end 51b (the portion designated by C in FIG. 11) of the terminal 51 cannot be prevented. Further, in forming the deformation preventing rib, the die of the portion designated by D in FIG. 11 becomes complicated, resulting in shortage in the die strength and in inclination to unstable product shape.

Figure 12:
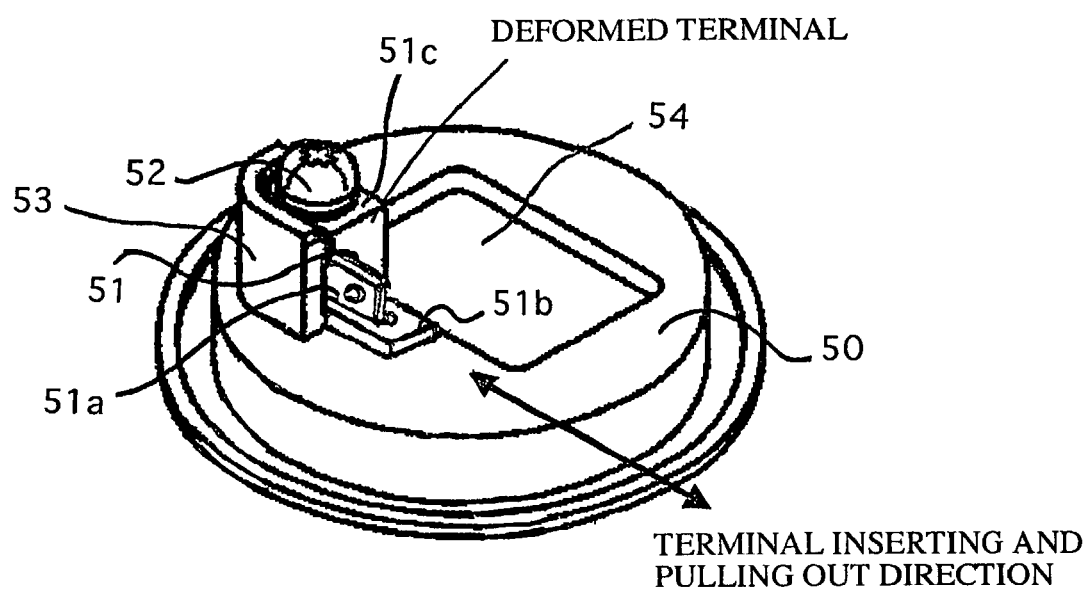
FIG. 12 is a perspective view showing the neighborhood of the connector in the ballast according to a fourth embodiment.
Figure 13:
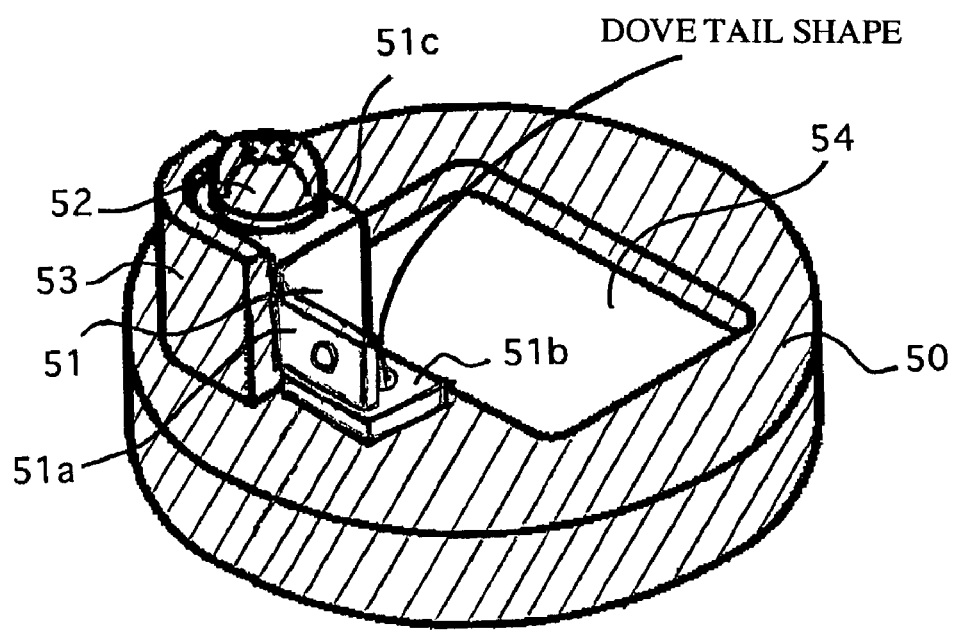
FIG. 13 is a perspective view showing the neighborhood of the connector in the ballast according to a fourth embodiment.

To that end, as shown in FIGS. 12 and 13, the insertion into and pull out from the connector may be made toward and away from an operator in FIG. 12 (i.e., in a direction parallel to the upper surface of the ballast connector 50). Taking this arrangement, the terminal 51a of the terminal 51 becomes closer to the terminal fixing screws 52, thus enduring a deformation. At the same time, by adding a dovetail shape to one end 51b of the terminal 51, the deformation attributed to insertion and pull out from the connector is surely prevented.

In FIG. 13, in order to distinguish the terminal 51, the portions other than the terminal 51 are depicted with hatched lines.

When the above dovetail is formed by a die, since the die is capable of dies cutting in the same direction as that of the terminal fixing seat, the dovetail is formed without complicating the die.

Fifth Embodiment

The fifth Embodiment is directed to explain a modification of the lead wire for connector connection in an electromagnetic wave shielding wire and a cover shielding wire.

The fifth embodiment will be described with reference to FIGS. 14 through 18.

Figure 14:
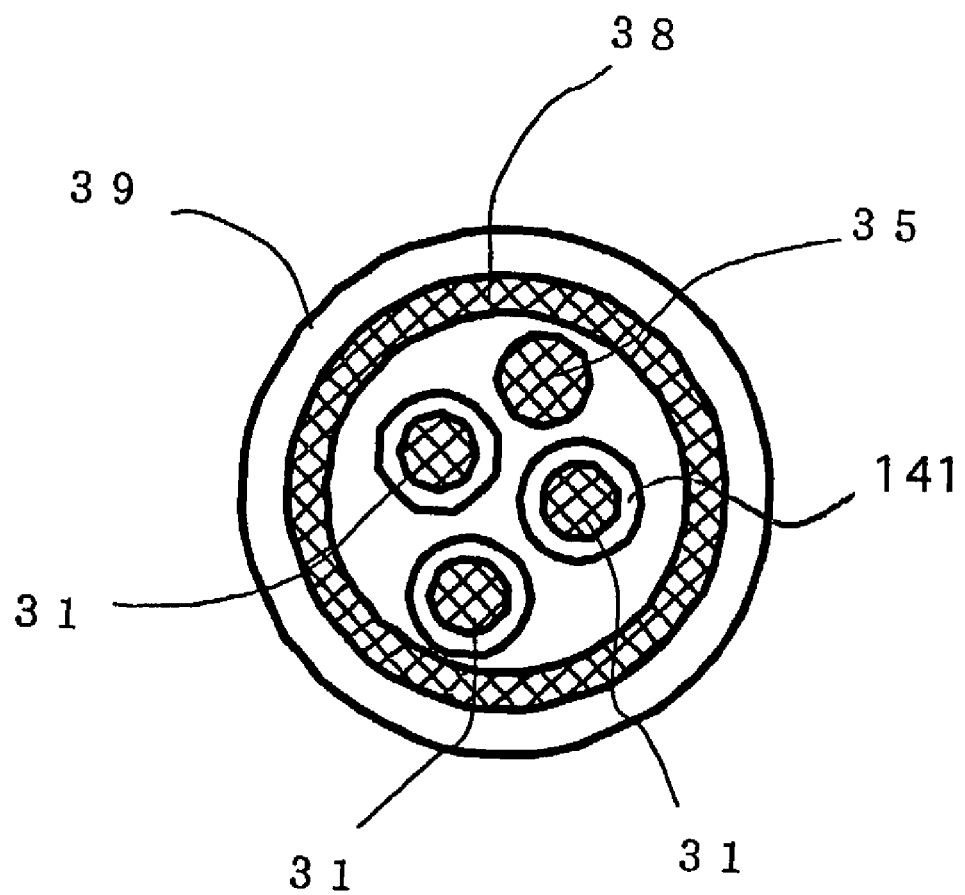
FIG. 14 is a sectional view of the electromagnetic wave shielding wire in a fifth embodiment of the invention.

FIG. 14 is a sectional view of the electromagnetic wave shielding wire and is different from that shown in FIG. 6 in the following point. Namely, while the signal wires 31 (3 wires in this example) in the example shown in FIG. 6 are integrally bundled by the polymer tube 32, the one shown in FIG. 14 the signal lines 31 and the lead wire 35 for connector connection are directly wrapped by the cover shielding wire 38. Here, a resin tube 141 as an insulating member is formed around each of the signal lines 31, which insulates the signal lines 31 from the lead wire 35 for connector connection and the cover shielding wire 38.

While a flat shape (plate shape) conductor is used as the lead wire 35 for connector connection in FIG. 6, around (circular) type ordinary conductor is used in FIG. 14.

Figure 15:
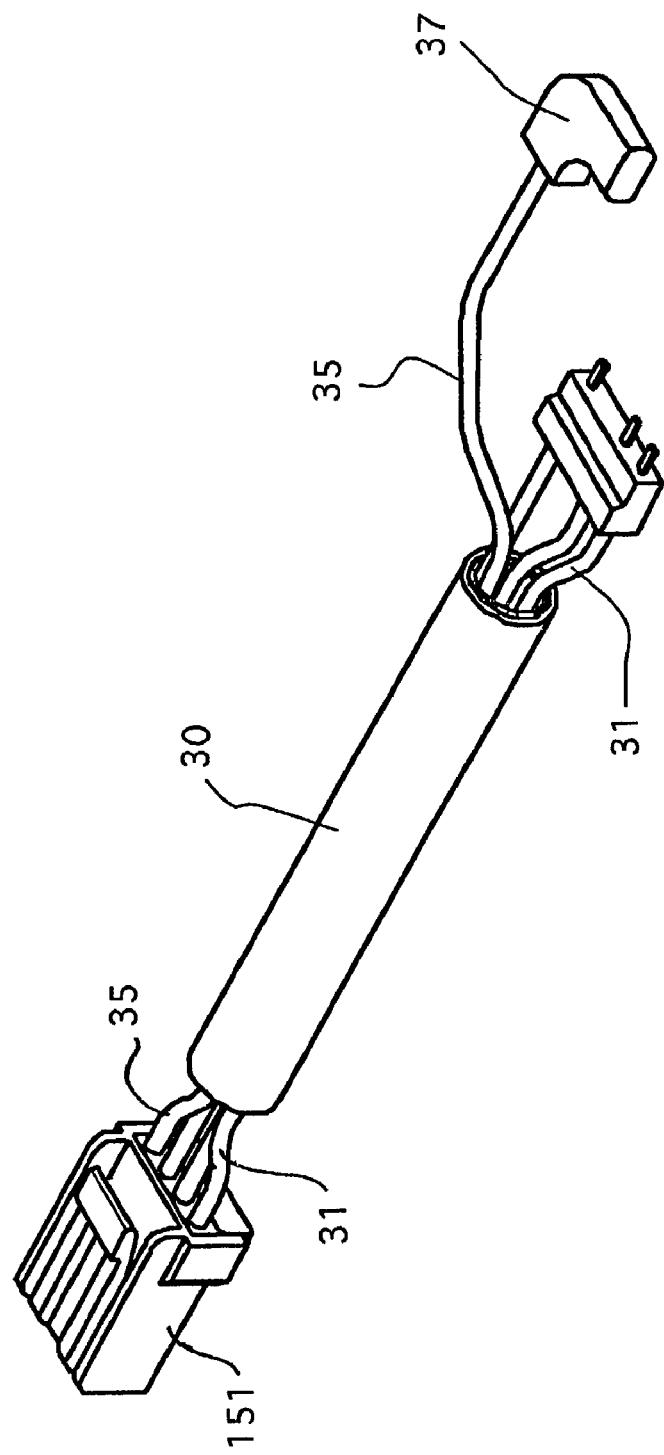
FIG. 15 is an external view of the electromagnetic wave shielding wire in a fifth embodiment.

FIG. 15 shows an external view of the fifth embodiment and is different from that shown in FIG. 4. Namely, while the first socket 33 and the lead connector 36 are separately formed in FIG. 4, a connector 151 having integrated both members is provided in FIG. 15. For this reason, a round type lead wire 35 for connector connection is adopted.

Figure 16:
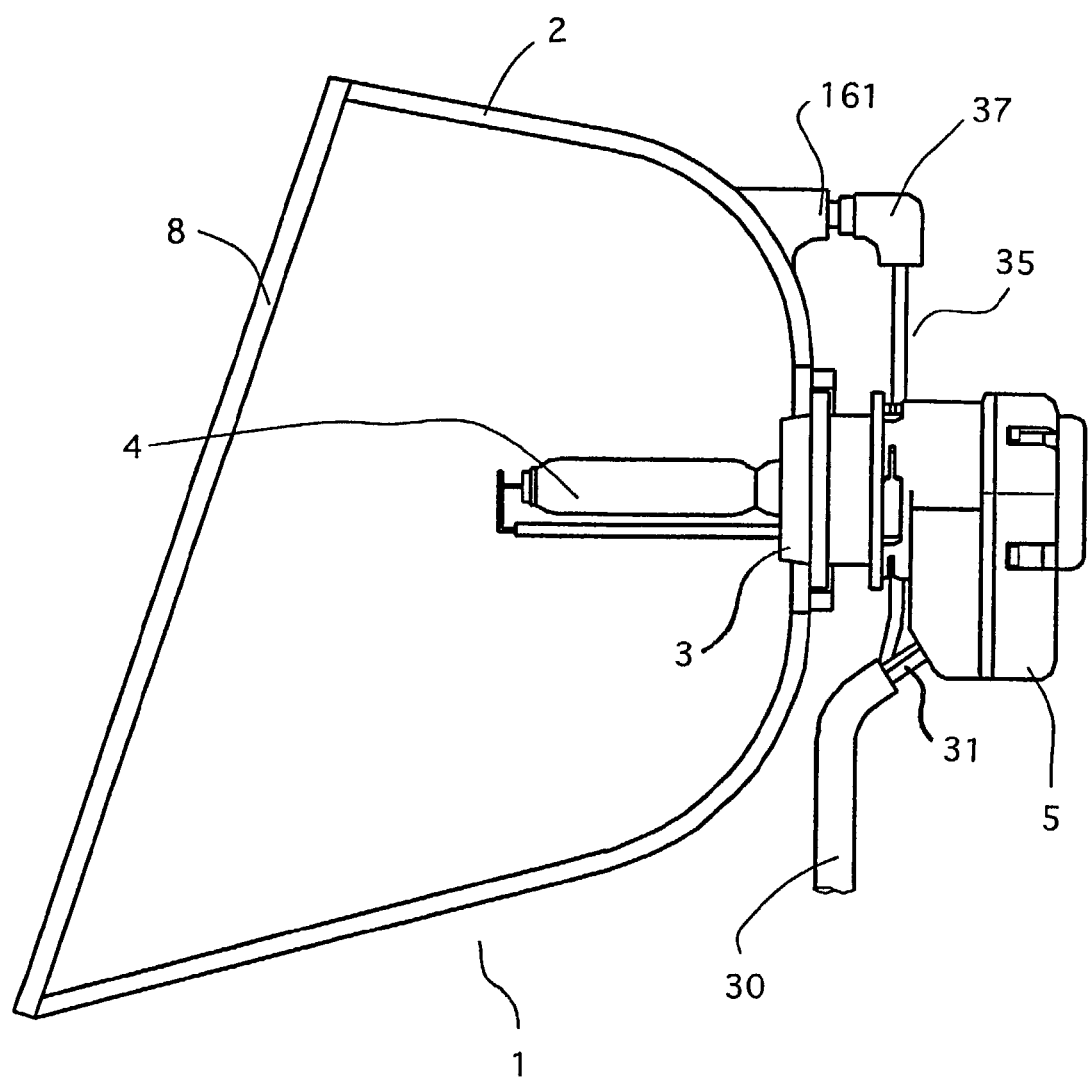
FIG. 16 is an explanatory partial sectional view showing a discharge lamp using a harness of a fifth embodiment.

FIG. 16 shows a discharge lamp using the harness of the fifth embodiment.

In FIG. 16, the inner surface of the housing 1 is utilized as the reflector 2. In addition, the bulb socket 3 and the ignitor 5 are integrated and connected to the housing 1. Still further, a housing ground terminal 161 corresponding to the lead connector 37 is provided on the housing 1 and is connected to a ground of a motor vehicle body or the like (not shown).

Figure 17:
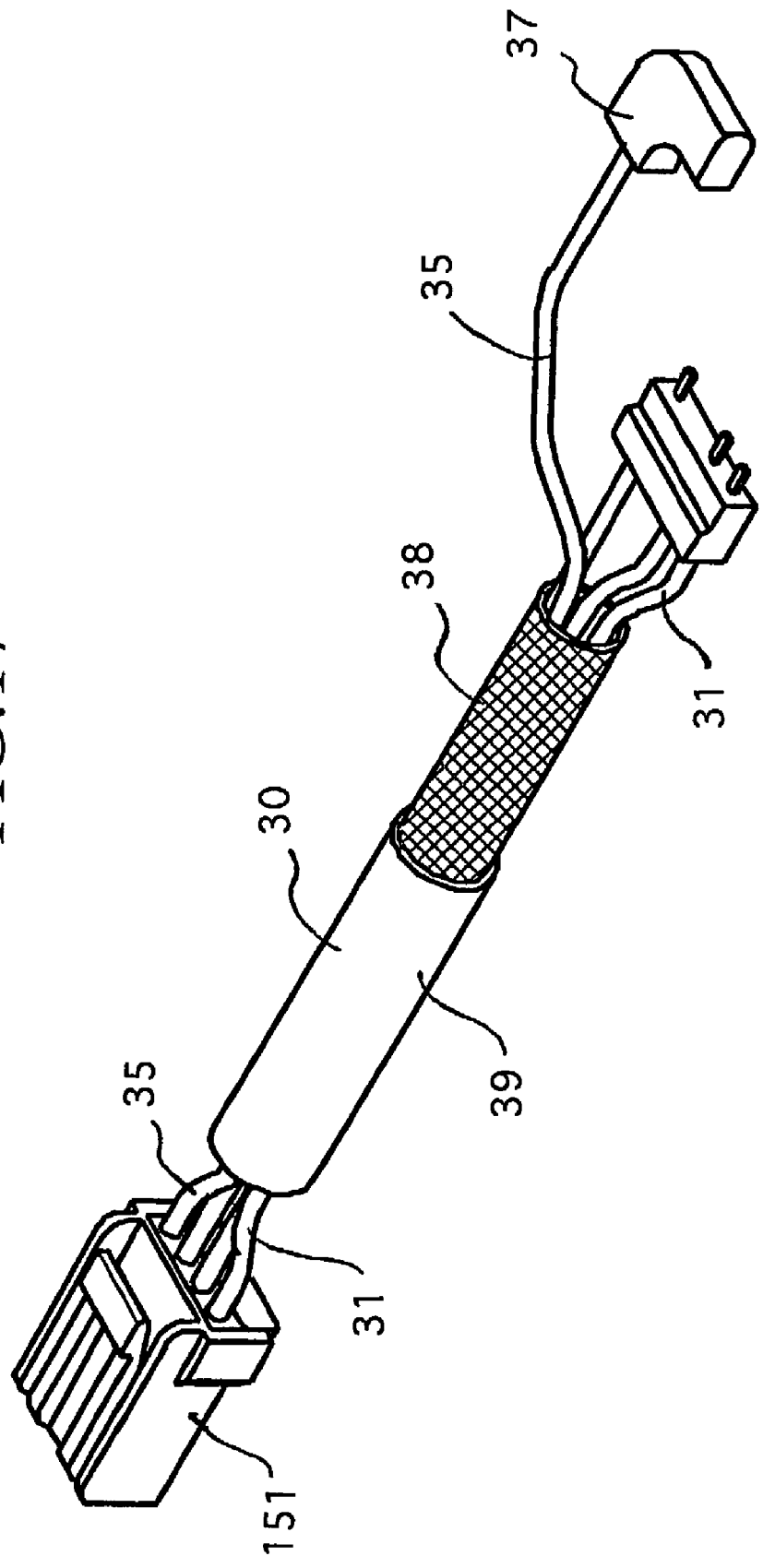
FIG. 17 is an external view in which a part of the heat-contraction resin tube 39 is peeled off for explaining the harness in a fifth embodiment of the invention.

FIG. 17 is a perspective view with the heat-contraction resin tube 39 partly peeled off for explaining such a harness as is shown in FIG. 15.

Figure 18:
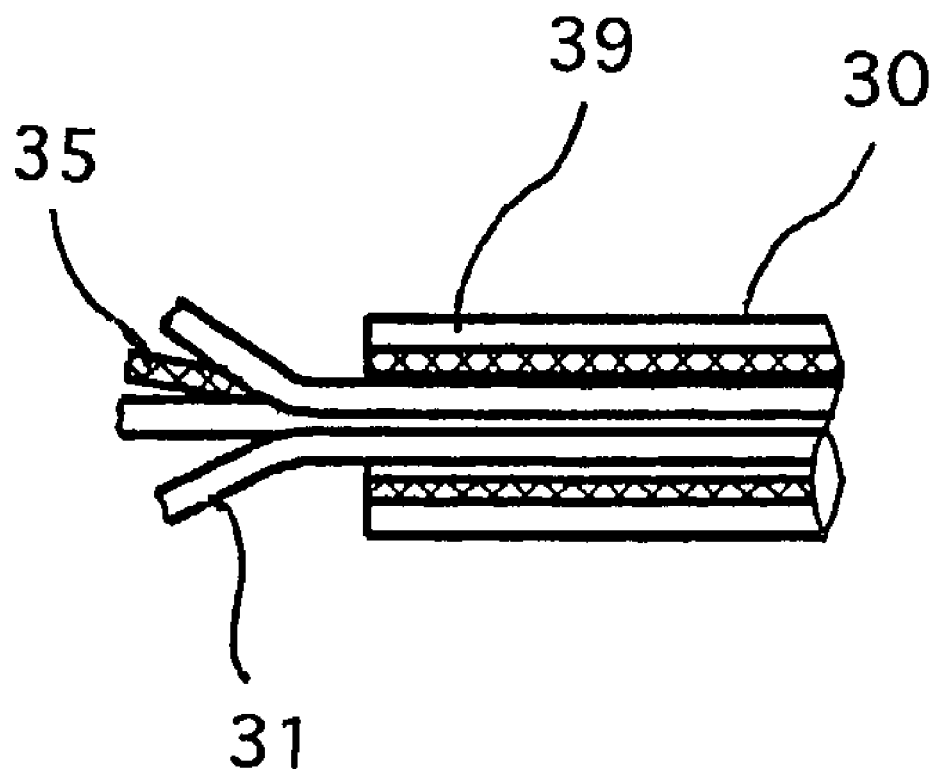
FIG. 18 is an axial sectional view of the harness 30 in a fifth embodiment.

FIG. 18 is an explanatory sectional view of the harness 30 and shows an arrangement of the signal lines 30 and the lead wire 35 for connector connection inside the harness 30.

Sixth Embodiment

The sixth embodiment is directed to explain a modification of the lead wire for connector connection in an electromagnetic wave shielding wire.

The sixth embodiment will be described with reference to FIGS. 19, 20.

Figure 19:
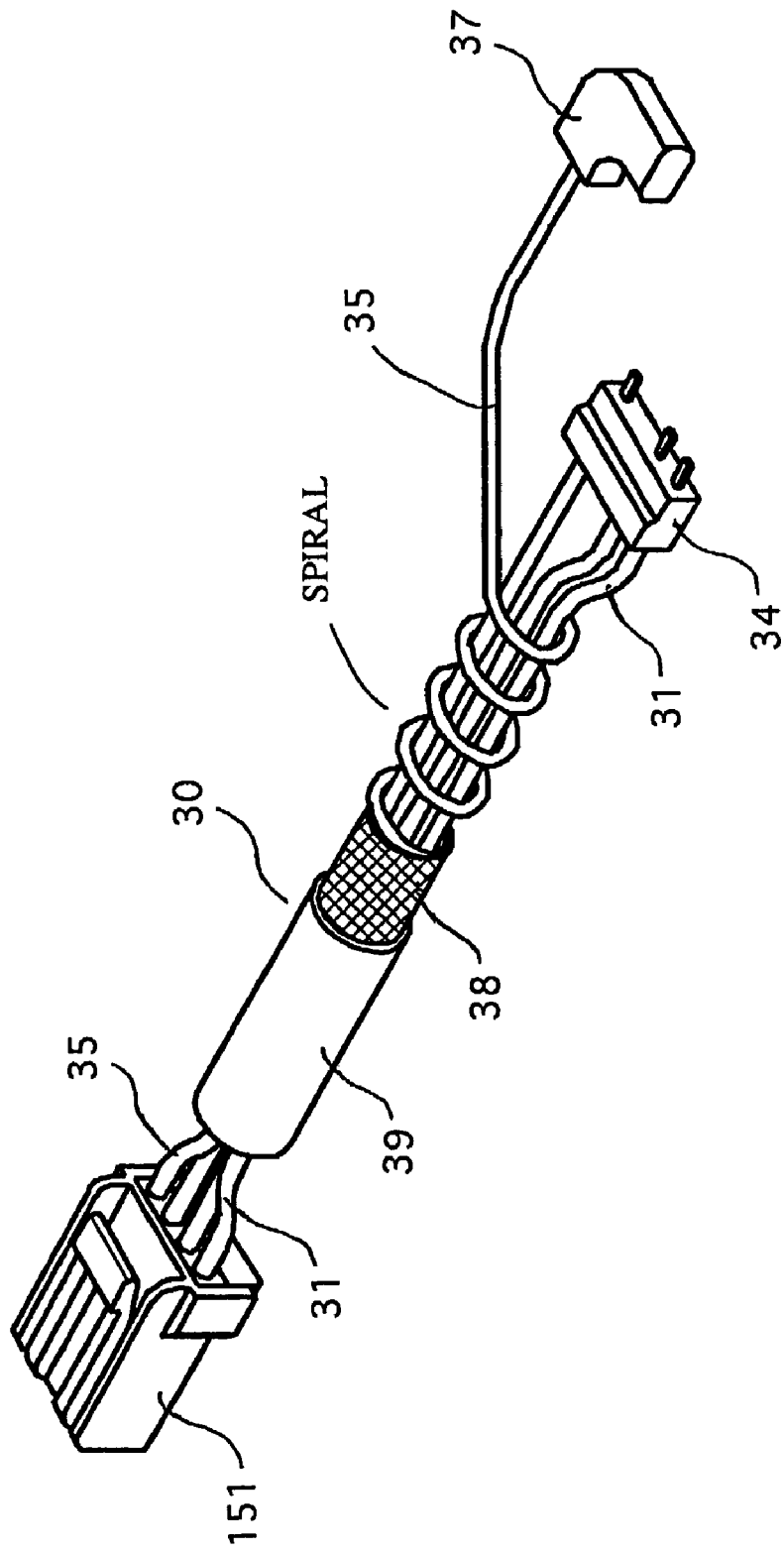
FIG. 19 is an external view in which a part of the heat-contraction resin tube 39 and a part of the cover shielding wire 38 is peeled off for explaining the harness in a sixth embodiment of the invention.

As shown in FIG. 19, the lead wire 35 for connector connection is spirally wound inside the cover shielding wire 38. In this arrangement, by pulling the lead wire 35 for connector connection (in this example, in the lead connector 37 direction), the winding pitch at the spiral portion of the lead wire 35 for connector connection is increased. This prolongs the length at the portion other than the cover shielding wire 38.

Taking this arrangement, it becomes possible to deal with products of various specifications in which the relative positions of mounting the second socket (on the lamp socket side) 34 and the lead connector 37 are different from each other. In a discharge lamp, in particular, the position of the housing ground terminal 161 on which the lead connector 37 is mounted often varies from product to product relative to the positions of ignitor 5 on which the second socket (lamp-socket side) 34 is mounted and the lamp socket 3, for reasons of design of the housing and the wiring of the ground wire inside the vehicle compartment. As a result, it is possible to share common parts for various products, or the common products themselves, reducing manufacturing cost.

Further, as a result of the spiral arrangement of the lead wire 35 for connector connection, the lead 35 contacts with the cover shielding wire 38 over longer area (i.e., the contact area increases). Therefore, the lead 35 contacts with the cover shielding wire 38 stably and the shielding performance is improved.

Figure 20:
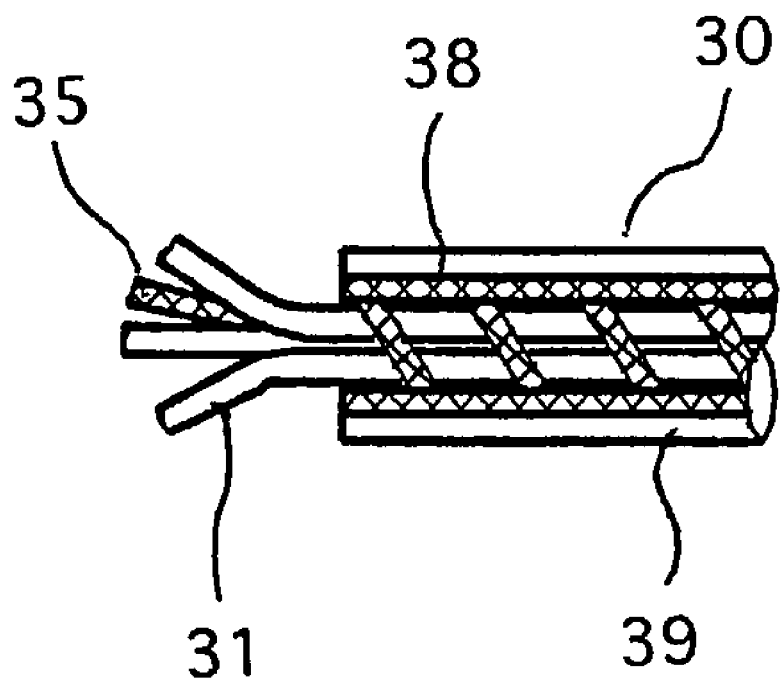
FIG. 20 is an axial sectional view of the harness 30 in a sixth embodiment.

FIG. 20 is an axial sectional view of the harness 30 and shows the arrangement of the signal lines 31 inside the harness 30 and the lead wire 35 for connector connection.

As described above, respective embodiments have been described, each having the following features.

As one of the features of each embodiment, the following is given.

In a lighting control device for a headlamp of a vehicle including an HID bulb (discharge bulb) disposed in the headlamp of the vehicle; a ballast (driving power circuit) for supplying alternating current from a battery power source to the HID bulb; an ignitor (starting circuit) for applying a high-voltage pulse to start the discharging of the HID bulb; a harness (power supply line) extending to the ballast, the ignitor and the HID bulb; and a braided cover shielding wire for shielding the electromagnetic noises from the harness by covering the harness, the cover shielding wire covering the entire harness and the lead wire for connector connection are provided in separate bodies and, in addition, the cover shielding wire and the lead wire for connector connection are at least partly in electrical contact with each other. Therefore, in a lighting control device for the headlamp of the vehicle, including a harness (power supply line) and a braided cover shielding wire for shielding the electromagnetic wave noises from the harness by covering the harness, the electromagnetic wave shielding wire is provided so that the cover shielding wire for covering the entire harness and the lead wire for connector connection are provided in separate bodies, and the cover shielding wire and the lead wire for connector connection are at least partly in electrical contact with each other. As a result, when providing the lead wire for connector connection for connecting the cover shielding wire to the lighting fixture side and to the ballast side, the independent lead wire for connector connection is directly connected to the respective connectors without unknitting the braid at the distal end of the cover shielding wire made up of a braided wire, thereby bringing the cover shielding wire and the lead wire for connector connection into electrical contact with each other. The connection of the connectors becomes very simple and easy, and time required for assembly work is largely shortened, resulting in an improved productivity.

As another feature, the following is given.

Since the lead wire for connector connection is in electrical contact with the inside of the cover shielding wire, and the lead wire for connector connection is at least one continuous conductor and passes through the inside of the cover shielding wire, the electromagnetic-shielding wire is contacted by the lead wire for connector connection is in electrical contact with the inside of the cover shielding wire and the lead wire for connector connection is at least one continuous conductor to pass through the inside of the cover shielding wire. In this manner, sandwiching the lead wire for connector connection inside the cover shielding wire eliminates any special parts to electrically contact the cover shielding wire and the lead wire for connector connection. In other words, at the time of assembling, flexible cover shielding wire is compressed into a short length and is expanded diametrically, and the harness and the lead wire for connector connection are inserted thereinto. Thereafter, by extending it to the ordinary length, the inner wall surface of the cover shielding wire and the lead wire for connector connection are electrically contacted. Preferably, in order to keep the state as it is, means for restricting the expansion of the cover shielding wire is provided so as to remain the length of the cover shielding wire unchanged.

As another feature, the following is given.

Because the lead wire for connector connection is in electrical contact with the cover shielding wire on the outside thereof and the lead wire for connector connection is at least one continuous conductor, the electromagnetic wave shielding wire is in electrical contact by the lead wire for connector connection with the outside of the cover shielding wire and the lead wire for connector connection is at least one continuous conductor. Since the lead wire for connector connection is arranged to run along the outside of the cover shielding wire, after the harness is covered by the cover shielding wire, the lead ire for connector connection may only be laid on the outside of the cover shielding wire to fix them together with a fixing member, improving the productivity. Increased fixed areas by the fixing member are recommended.

As another feature, the following is given.

Since the lead wire for connector connection is provided separately on both ends of the cover shielding wire and both the lead wires for connector connection are in electrical contact with the outside or the inside of the cover shielding wire, the electromagnetic wave shielding wire is provided separately by the lead wires for connector connection on both ends of the cover shielding wire and both the lead wires for connector connection are in electrical contact with the outside or the inside of the cover shielding wire. After mounting the respective connectors on a pair of lead wires for connector connection, both the lead wire for connection to the connectors are inserted into the outside or the inside of both ends of the respective cover shielding wires. Therefore, the lines for connector connection need only to be fixed together with the cover shielding wire by the fixing members, improving the productivity. Increased fixed areas by the fixing members are recommended.

As still another feature, the following is given.

Since both the cover shielding wire and the lead wire for connector connection are retractable shield sleeves formed by braided wires made up at least of highly conductive copper base fine wires and highly flexible resin base fine wires, the electromagnetic wave shielding wire is a retractable shield sleeve formed by braided wires made up at least of highly conductive copper base fine wires and highly flexible resin base fine wires. By adopting both the cover shielding wire and the lead wire for connector connection as braided conductors, the electrical contact area between both is largely increased. This remarkably improves the electromagnetic wave shielding performance of the electromagnetic wave shielding wire.

As still another feature, the following is given.

Since both the cover shielding wire and the lead wire for connector connection are subjected to the surface treatment of plating with gold, silver, tin, nickel or zinc on the surfaces of the copper base fine wires, the electromagnetic wave shielding wire is subjected to the surface treatment of plating with gold, silver, tin, nickel or zinc on the surfaces of the copper base fine wires. In particular, by plating the surfaces of the copper base fine wires of the lead wire for connector connection with gold, silver, tin, nickel or zinc, the improved heat resistance and the corrosion resistance are expected without impairing the conductivity.

As still another feature, the following is given.

Since a part or both ends of the cover shielding wire and the lead wire for connector connection are integrally fixed together by heat-contraction resin tubes, the electromagnetic wave shielding wire is integrally fixed partly or on both ends of the cover shielding wire and the lead wire for connector connection by the heat-contraction resin tubes. Therefore, by integrally fixing the terminals of both the cover shielding wire and the lead wire for connector connection by heat-contraction resin tubes, the terminal connection of the braided conductor, i.e., the cut surfaces of the fine copper base wires of the cover shielding wire are protected such that they are prevented from getting loose and the cut surfaces of the fine copper base wires are unexposed, and the electrical contact between both the members is maintained well.

INDUSTRIAL APPLICABILITY

As described above, the shielding wire, the method of manufacturing the shielding wire and the lighting device for the discharge lamp using the shielding wire of the invention are simple in the terminal connection and are qualified for a high-voltage harness of high mechanical and electrical reliability as well as for a discharge lamp used in a headlamp of a motor vehicle, a lighting lamp for an indoor facility, warehouse, factory, or the like, using this high-voltage harness.

What is claimed is:

1. A shielding wire comprising:
    a shield; and
    a conductor, sheathed with an insulating member, said conductor passes through an interior of said shield and is disposed therein such that a portion of said conductor is in direct electrical contact with said shield,
    wherein a first connector is fitted to one end of said conductor that is pulled out from said shield and a second connector is fitted to an opposite end thereof.

2. The shielding wire according to claim 1, wherein said conductor is a braided conductor.

3. The shielding wire according to claim 1, wherein a surface of said conductor and said shield is treated by shielding with gold, silver, tin, nickel or zinc.

4. The shielding wire according to claim 1, wherein both ends of said conductor are covered with resin.

5. The shielding wire according to claim 1, further comprising a plurality of bundled portions, one of which is provided at each end of said shielding wire, and another one of which is provided at a center of said shielding wire.

6. The shielding wire according to claim 1, wherein said conductor is divided into two portions, such that a first portion is disposed at one end of said shield and a second portion is disposed at an opposite end of said shield.

7. The shielding wire according to claim 1, wherein said conductor is a flat-shaped wire.

8. A shielding wire comprising:
   a shield;
   a first conductor, sheathed with an insulating member, said first conductor passes through an interior of said shield and is disposed therein such that a portion of said first conductor is in direct electrical contact with said shield; and
   a second conductor sheathed with an insulating member, disposed in parallel with said first conductor, for carrying a power supply and an electrical signal;
   wherein a first connector is fitted to one end of said first conductor and one end of said second conductor, that are pulled out from said shield, to integrally assemble said first and second conductors, and a second connector is fitted to an opposite end of said first conductor.

9. A shielding wire comprising:
   a shield;
   a first conductor sheathed with an insulating member which passes through an interior of said shield and is disposed therein such that a portion of said first conductor is in electrical contact with said shield; and
   a second conductor sheathed with an insulating member, disposed in parallel with said first conductor, for carrying a power supply and an electrical signal;
   wherein a first connector is fitted to one end of said first conductor and one end of said second conductor, that are pulled out from said shield, to integrally assemble said first and second conductors, and a second connector is fitted to an opposite end of said first conductor,
   wherein said first conductor is spirally wound around said second conductor disposed inside said shield.

10. A method of manufacturing a shielding wire comprising:
   a shield;
   a conductor, sheathed with an insulating member, said conductor passes through an interior of said shield and is disposed therein such that a portion of said conductor is in direct electrical contact with said shield; and
   a bundled portion for bundling said conductor and said shield, said method comprising:
   inserting said conductor into said shield;
   bundling said conductor and said shield by said bundled portion in a state in which said conductor is inserted into said shield, and such that a portion of said conductor is in direct electrical contact with said shield; and
   fitting a first connector to one end of said conductor that is pulled out from said shield, and a second connector to an opposite end of said conductor.

* * * * *